United States Patent
Fiala

(10) Patent No.: US 9,895,756 B2
(45) Date of Patent: Feb. 20, 2018

(54) FLIP-DOWN TABLE-SAW FENCE

(71) Applicant: Paul Eugene Fiala, Anaheim, CA (US)

(72) Inventor: Paul Eugene Fiala, Anaheim, CA (US)

(*) Notice: Subject to any disclaimer, the term of this patent is extended or adjusted under 35 U.S.C. 154(b) by 26 days.

(21) Appl. No.: 15/152,348

(22) Filed: May 11, 2016

(65) Prior Publication Data
US 2016/0332242 A1 Nov. 17, 2016

Related U.S. Application Data

(60) Provisional application No. 62/179,581, filed on May 11, 2015.

(51) Int. Cl.
B23D 47/02 (2006.01)
B27B 27/08 (2006.01)

(52) U.S. Cl.
CPC ............ B23D 47/025 (2013.01); B27B 27/08 (2013.01)

(58) Field of Classification Search
CPC .............................. B23D 47/025; B27B 27/08
See application file for complete search history.

(56) References Cited

U.S. PATENT DOCUMENTS

| | | | | |
|---|---|---|---|---|
| 4,593,590 A * | 6/1986 | Gray | ....................... | B27B 27/10 83/435.2 |
| 4,600,184 A * | 7/1986 | Ashworth | .............. | B23Q 3/005 269/303 |
| 4,964,450 A * | 10/1990 | Hughes | ................ | B23D 47/025 144/286.5 |
| 5,038,486 A * | 8/1991 | Ducate, Sr. | ............. | B27B 25/10 33/430 |
| 5,078,373 A * | 1/1992 | Miller | ..................... | B27B 27/02 269/303 |
| 5,123,317 A * | 6/1992 | Barnes, Jr. | ........... | B23D 47/025 83/477.1 |
| 5,337,641 A * | 8/1994 | Duginske | ................ | B27B 25/10 144/253.1 |
| 5,460,070 A * | 10/1995 | Buskness | ............... | B23Q 3/007 269/303 |
| 5,617,909 A * | 4/1997 | Duginske | ................ | B27B 25/10 144/253.1 |
| 5,722,308 A * | 3/1998 | Ceroll | .................... | B23Q 3/007 144/253.1 |
| 6,240,822 B1 * | 6/2001 | Musser | ................ | B23D 47/025 144/145.1 |
| 6,675,686 B2 * | 1/2004 | Pedersen | .................. | B27G 5/04 33/629 |
| 6,899,004 B1 * | 5/2005 | Miller | ..................... | B27B 27/02 144/253.1 |
| 7,404,350 B2 * | 7/2008 | Chuang | .................... | B27B 27/02 83/438 |
| 7,707,920 B2 * | 5/2010 | Gass | .................... | B23D 45/067 83/471.1 |
| 9,302,371 B2 * | 4/2016 | Chen | ....................... | B25B 11/00 |

* cited by examiner

Primary Examiner — Sean Michalski
(74) Attorney, Agent, or Firm — Canady & Lortz LLP; Bradley K. Lotz

(57) ABSTRACT

A Flip-Down Table-saw Fence (FTF) is disclosed for accurately cutting cabinet parts faster while eliminating the need to do math and without the use of a tape measure. An apparatus for adjusting a width of a cut by a table saw, comprises a saddle for setting on a fence of the table saw, a side of the fence defining the width of the cut; and at least a first spacer hinged to the saddle such that the first spacer can be flipped down about a first pivot point to be disposed adjacent to the side of the fence shortening the width of the cut by a first spacer width.

19 Claims, 8 Drawing Sheets

(A)

(B)

(C)

(A)

(B)

(C)

FLIP-DOWN TABLE-SAW FENCE

INTRODUCTION

Cabinet-making is a long established industry. However, it is long overdue for a revolutionary advancement that will significantly reduce the time, labor, and costs to produce cabinets. The Flip-down Table-saw Fence (FTF) system described herein will do exactly that.

CROSS REFERENCE TO RELATED APPLICATIONS

Provisional Patent Application No. 62/179,581, filed May 11, 2015 by Paul E. Fiala.

BACKGROUND OF THE INVENTION

In the field of cabinetmaking, there is a great deal of math involved. A typical kitchen base cabinet with one drawer will have two cabinet sides, one top, one bottom, one back, one shelf, one drawer bottom, one drawer box front, one drawer box back and two drawer box sides. Not counting the doors or the decorative drawer front or toe kick, there are eleven parts to the typical base cabinet box construction. Each part has three dimensions, thickness, width and length. Eleven parts having three dimensions each is a total of thirty-three dimensions per cabinet box. Multiply that by the number of cabinet boxes in the average kitchen and there is a great deal of math to do. In addition, all those parts have to be cut to those sizes. All the widths and lengths will typically be cut on a table saw. This requires a great deal of time to do the math and keeping track of all the different sizes to accurately cut all the parts. As a result of normal human error, this process is prone to mistakes and parts wasted. Those mistakes can cost a great deal of time and money to correct, eating away at any profits.

For the normal kitchen base cabinets, the height and depth are always the same. These dimensions can be referenced as "CONSTANTS." For example, the sides of the cabinet are a function of both the height and depth and are the same whether the cabinet is ten inches wide or thirty inches wide. It is efficient to stock cabinet parts with standard heights and depths. The sides can be pre-cut to their height and depth, routed and drilled with holes and be done in high volume more efficiently then job by job. With all the set-ups that have to be accurate, running these parts in high volume or ordering parts this way will save a lot of time per part. The other "CONSTANTS" (the top, bottom, back, shelf, drawer bottom, and drawer front and back) can be machined in eight foot lengths in high volume while the business is in the slow seasons or ordered this way.

It is only the width that changes. Anything that is a function of the width (the top, bottom, back, shelf, drawer bottom, and drawer front and back) are the parts that are different sizes, which can be called VARIABLES. Each of these variables will be a given dimension smaller than the width of the cabinet. For example, the width (the dimension from left to right) of the adjustable shelf is the width of the cabinet minus the thickness of two sides and a small gap. That means a different math calculation and a different table-saw setting is required for every one of those parts. Even for those with experience, between the math and settings on the table saw, for every single part one must be careful not to make a mistake. There is a pattern that each part individually is always the same dimension smaller than the width of the cabinet. Accordingly, one can eliminate the math and the multiple different settings on the saw by using spacers for each part that were those given dimensions smaller than the width of the cabinet. So, one must only set the saw fence to the width of the cabinet to be built by putting a dimensioned spacer between the fence and the blade, next to the saw fence specific to each part to adjust the width of the cut to given part. As long as one accurately sets the fence to the size of cabinet to be cut, one not only completely eliminates the math needed, but using the appropriate spacers, every part is cut perfect every time with just one setting of the fence for each cabinet. This allows one to cut up cabinets faster than any other system. Creating a way to keep the spacers handy, yet out of the way when not needed, took years of trial and error and hundreds of hours of planning and drawing. The solution finally started by playing with hinging the spacers to move them in place and then out of the way. Having the need to use multiple spacers was tricky. Envisioning the final product, but making all the geometry of all the different spacers took many evolutions of prototypes.

This Flip-down Table-saw Fence (FTF) will work on most cabinets, base cabinets to upper cabinets and tall cabinets, including Garage, Bathroom Kitchen, laundry or just about any cabinet in any location.

BRIEF SUMMARY OF THE INVENTION

The "Flip-Down Table-saw Fence" (FTF) is a tool to accurately cut up cabinet parts faster while eliminating the need to do math and without the use of a tape measure. Currently, human error in the math and settings of the fence on the table saw contribute to costly errors when cutting the material.

Human error will always exist. The purpose of the Flip-down Table-saw fence (FTF), is to eliminate a great deal of it and speed up the process at the same time.

OBJECT AND SUMMARY OF THE INVENTION

A principle objective of the present invention is to provide for the first time a revolutionary mechanism for significantly reducing the time, labor, and costs to produce cabinets. There is no similar mechanism, device, or system in existence according to a preliminary patent search. The FTF mechanism will eliminate manually entering the height, depth, and width for each different part to be cut.

The FTF mechanism can be added on to an existing table-saw fence or a fully integrated flip-down table-saw fence. When the Flip-down Fence is set up it will not change the size of normal settings; a table-saw fence with the flip-down fence on it can still be used for all regular cuts.

Because of the different drawer systems and the various cabinet construction techniques, the FTF system allows the option of two separate flip-down fences on each system.

The FTF mechanism has three flip-down parts. Each flip-down part has to be flipped down only once for each part to be cut during a production run. This will lead to a very long life for each FTF mechanism with no need for regular servicing saws, saw blades, drills, nail guns, etc.

DETAILED DESCRIPTION OF THE INVENTION

Figure 1:
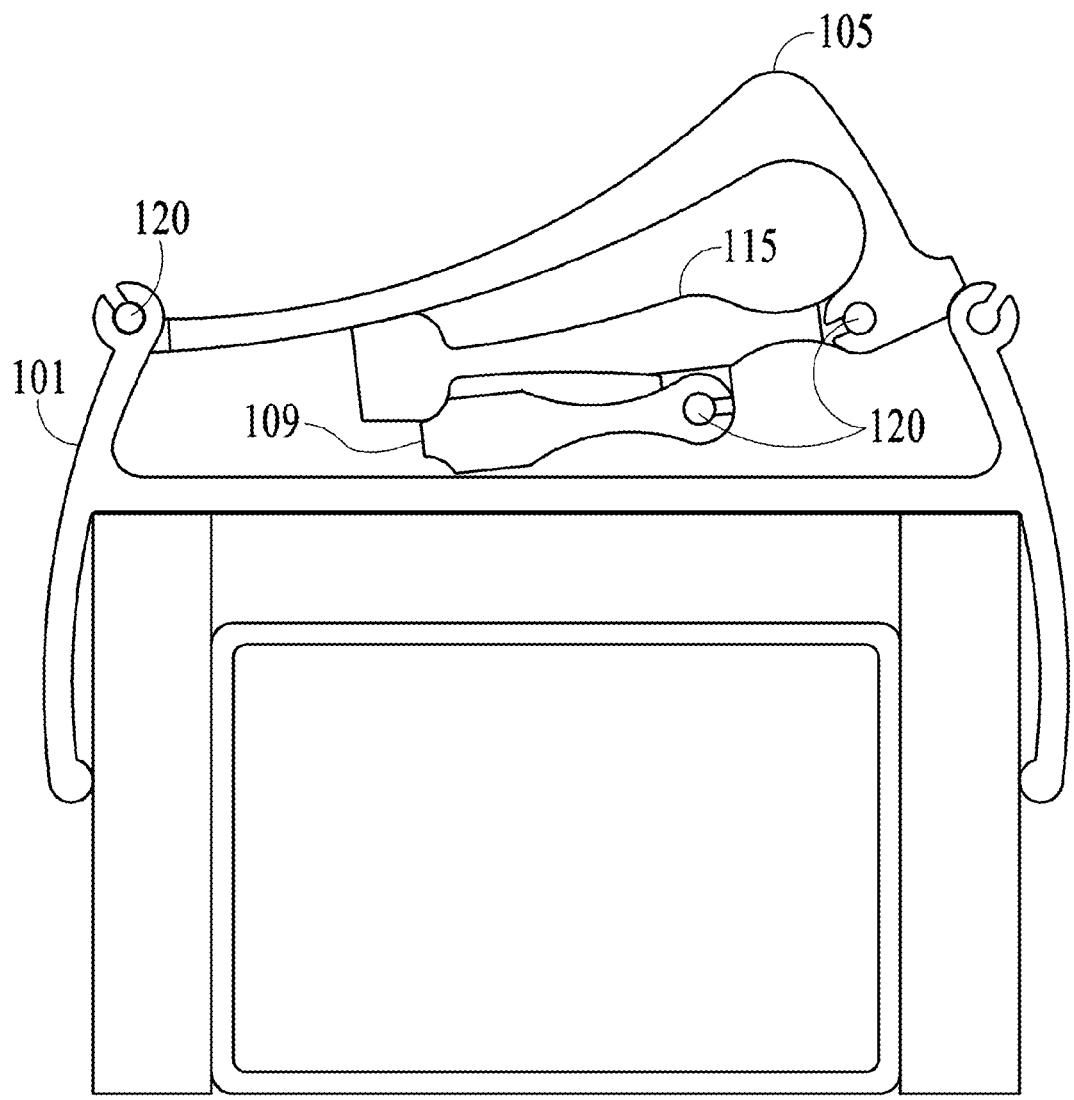
FIG. 1: End view of Actual size of Flip-down Table-saw Fence sitting on standard table-saw fence
Figure 2:
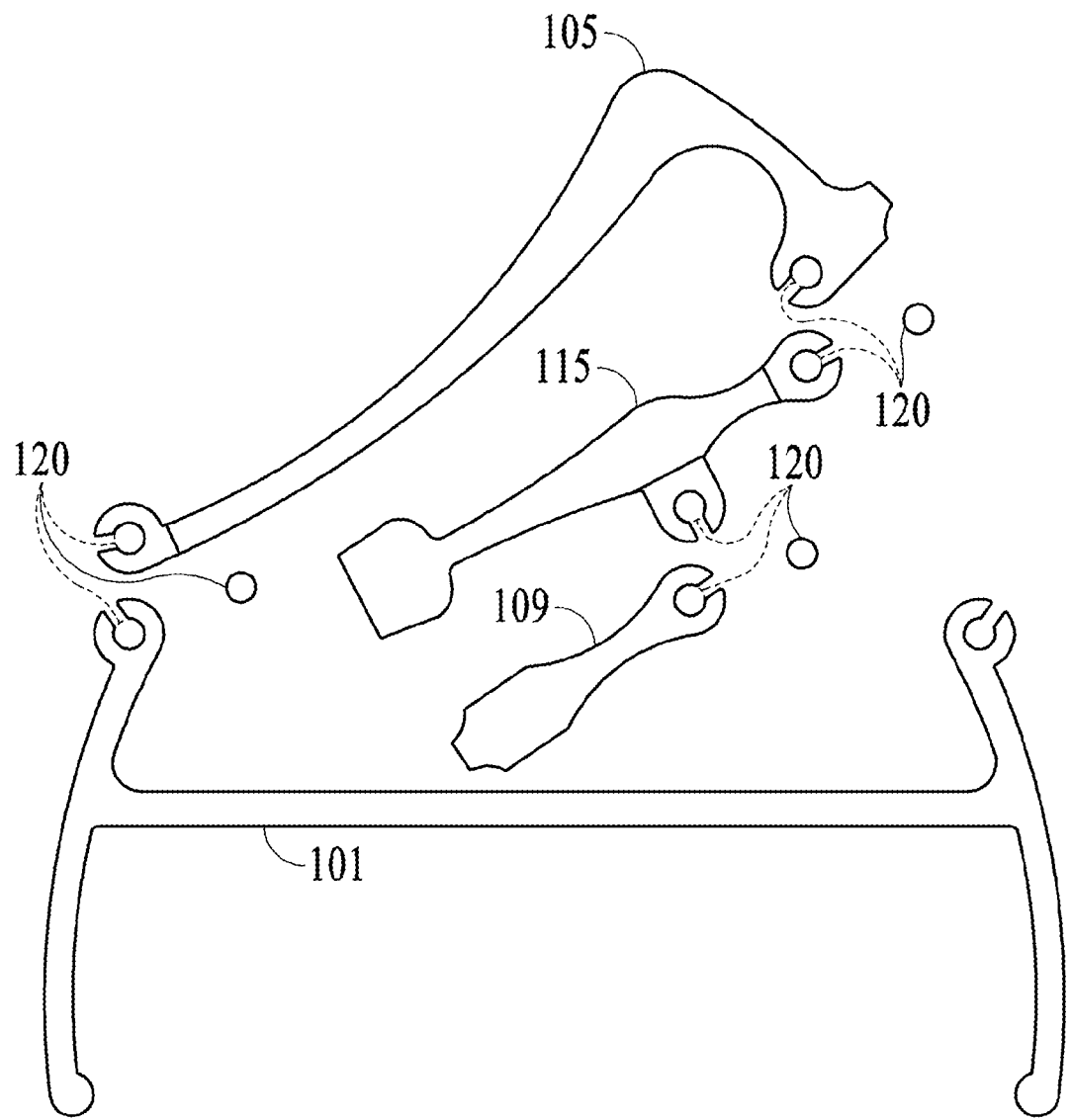
FIG. 2: Exploded end view of Flip-down Table-saw Fence
Figure 3:
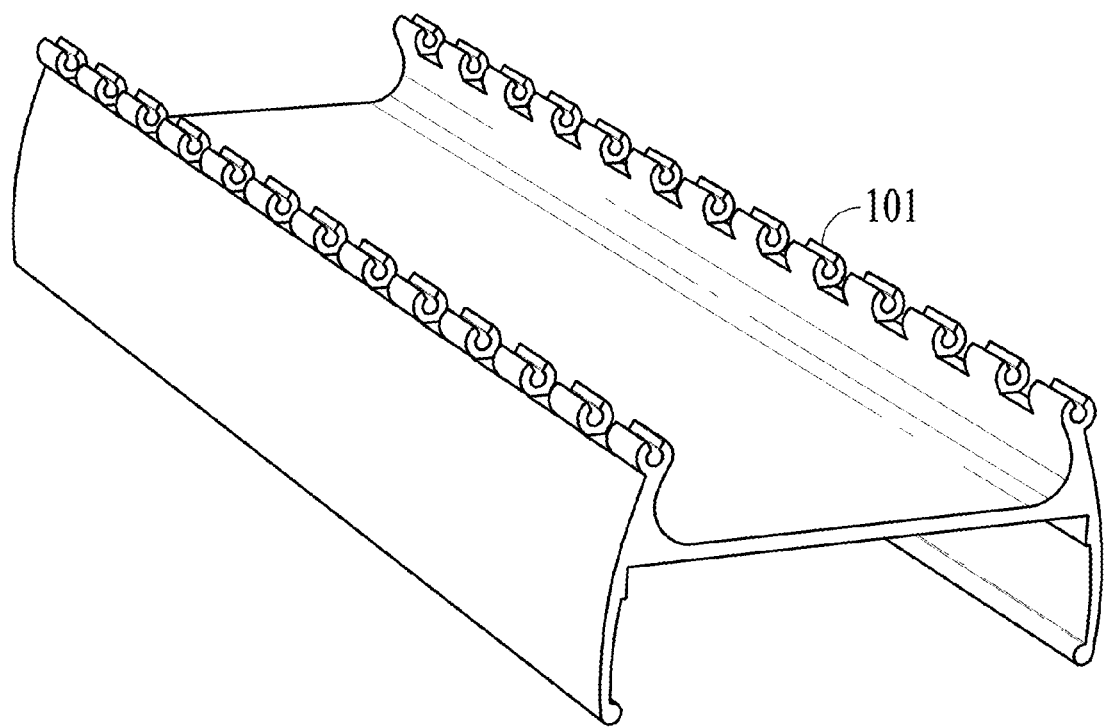
FIG. 3: Isometric view of Part #101. The "Saddle" that site on top of normal Table-saw fence

For the normal kitchen base cabinets, the height and depth are always the same. These dimensions can be referenced as "CONSTANTS." For example, the sides of the cabinet are a function of both the height and depth and are the same whether the cabinet is 10 inches wide or 30 inches wide. It is efficient to stock cabinet parts with standard heights and depths. i.e. "CONSTANTS." The sides can be pre-cut to their height and depth, routed and drilled with holes in high volume more efficiently than job by job. With all the set-ups that have to be accurate, running these parts in high volume will save a lot of time per part. Alternately, parts can be ordered this way. The other "CONSTANTS" (the top, bottom, back, shelf, drawer bottom, and drawer front and back) can be machined in eight foot lengths in high volume while the business is in a slow season or ordered this way.

On most cabinets, it is only the width of the cabinet that changes. Anything that is a function of the width, (the top, bottom, back, shelf, drawer bottom, and drawer front and back) are the parts that are different sizes left to right, which can be referenced as "VARIABLES." Only the "VARIABLES" need to be cut. Each of these "VARIABLES" will be a given dimension smaller than the width of the cabinet. For example, the width (the dimension from left to right) of the adjustable shelf is the width of the cabinet minus the thickness of two sides and a small gap. That means a different math calculation and a different table-saw setting is required for every one of those parts. Even for those with experience, between the math and settings on the table saw, on every single part, care has to be taken not to make a mistake. Each part individually is always the same dimension smaller than the width of the cabinet. The math and the multiple different settings on the saw can be eliminated by putting a pre-calibrated dimensioned spacer, specific to each part, next to the saw fence on the blade side to adjust the width of the cut to a given part. The saw fence only has to be set once to the desired width of the cabinet to be built. As long as the fence is accurately set to the size of cabinet to be built, not only is the math needed completely eliminated, but using the appropriate spacers, every part is cut perfect every time with just one setting of the fence for each cabinet. This system will cut up cabinets faster than any other system available.

This Flip-down Table-saw Fence (FTF) system will work on most cabinet construction systems, base cabinets to upper cabinets and tall cabinets, including Garage, bathroom kitchen, laundry or just about any cabinet in any location.

The flip-down Table-saw Fence is designed to streamline custom cabinetmaking by eliminating the math needed to correctly cut parts accurately and efficiently with the use of pre-calibrated spacers that conveniently move into place and move out of the way when not in use. The table saw fence only needs to be set once to the desired width of the cabinet to be built. Before cutting the individual parts, put the correct spacer in place parallel to the table saw fence on the blade side. In this example, a hinged spacer is used. The design in this example allows the three separate spacers in different combinations to flip down when needed and flip up out of the way when not needed.

The design here shows one way to do it using aluminum extrusions that friction fit on top of the table saw fence machined to hinge at certain pivot points. It can be made out of almost any structural material such as composites, polymers or metals, although lighter weight materials are preferred. The spacers can be removed and replaced by a variety of means. In this example, a hinging system was machined to remove and replace the spacers. Alternately, the spacers could be hinged using a flexible polymer similar to duct tape but more durable. In another option, the spacers could simply be set into a rack that sits on the table saw fence or somewhere nearby. The principle here is that the spacers save time and money by accurately offsetting the cutting of parts the first time.

Figure 4:
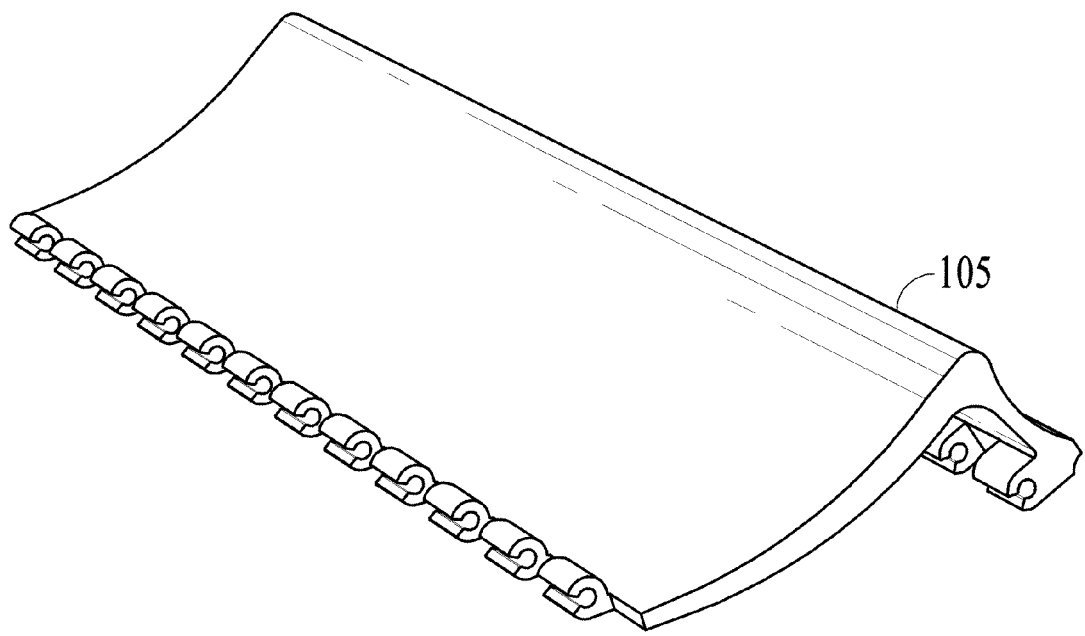
FIG. 4: Isometric view of Part #105. The Top, Bottom and back spacer
Figure 5:
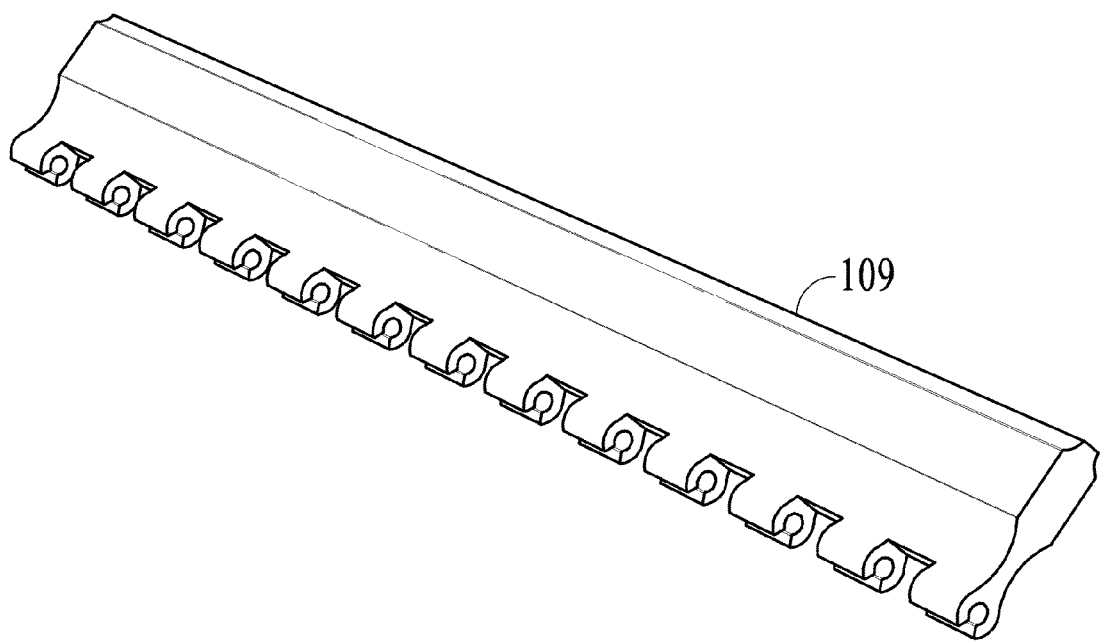
FIG. 5: Isometric view of Part #109. The Shelf spacer
Figure 6:
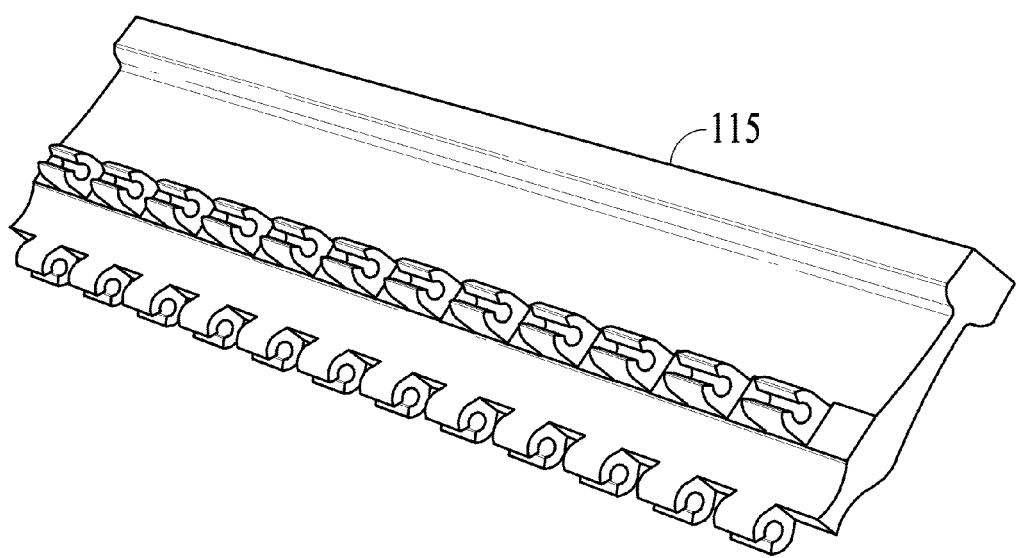
FIG. 6: Isometric view of Part #115. The Drawer spacer
Figure 7:
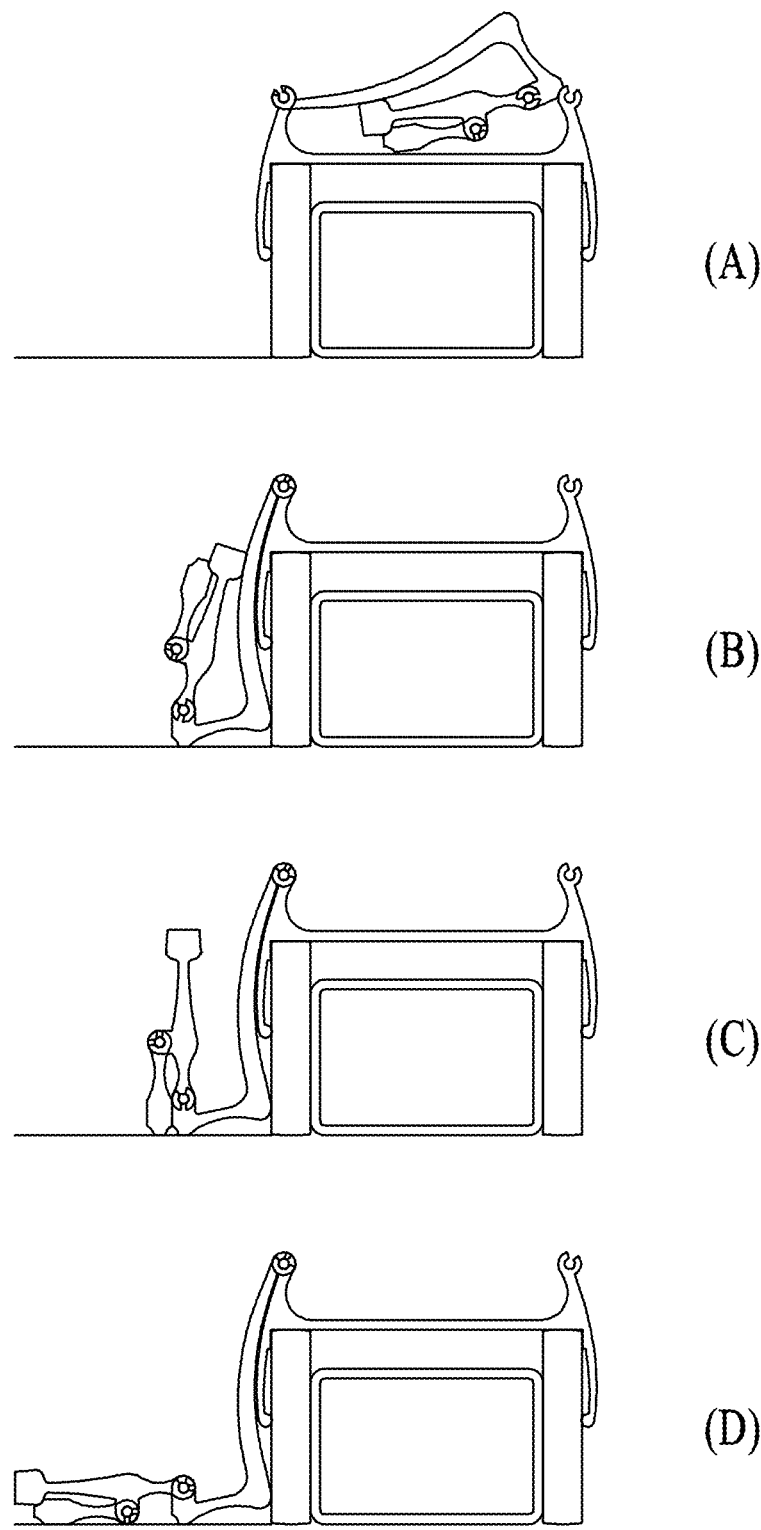
FIG. 7: End views of the different settings
Figure 8:
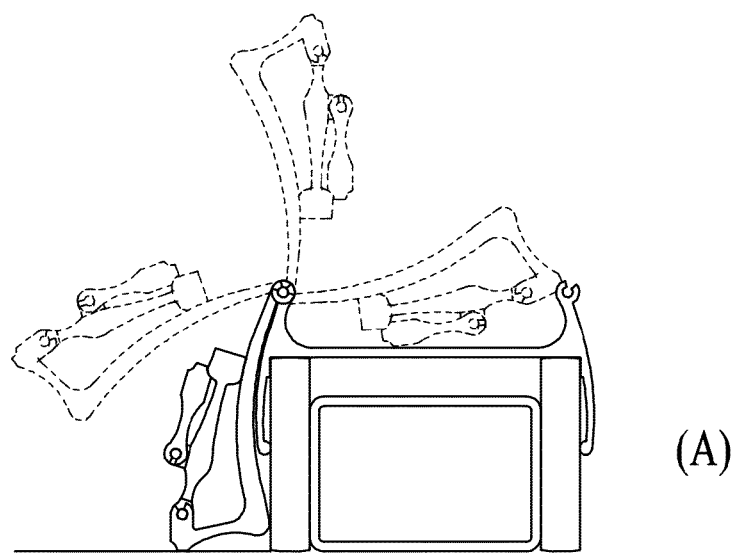
FIG. 8: End views of the different settings and attempt to show the parts in motion.
Figure 8:
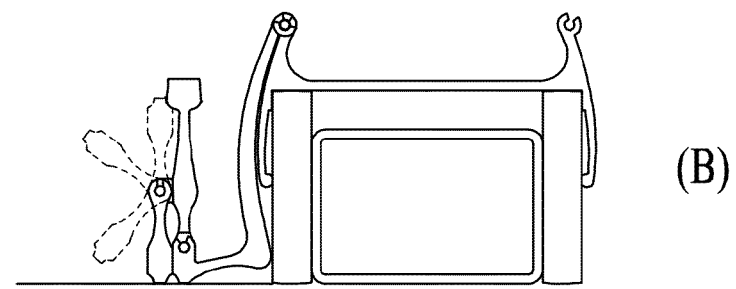
Figure 8:
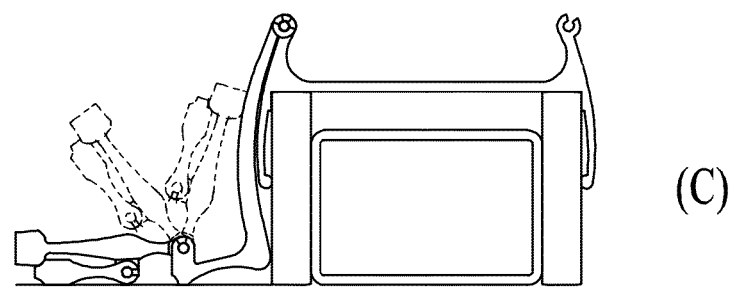

In this example, to use this fence, simply set the Flip-down Table saw Fence (FTF) on top of the existing table saw fence with the hinged side facing the blade and press down on it. See FIG. 1 and FIG. 7 Example A. Set the hairline on the table saw fence to the desired width of the cabinet. Flip down the first spacer, (FIG. 4, Part 105) and (FIG. 7 Example B) and cross cut the cabinet back, bottom and top to the correct width. Without resetting the table saw fence, flip down the second spacer, (FIG. 5, Part 109) and (FIG. 7, Example C) and crosscut all the shelves to the correct width. Without resetting the table saw fence, flip up the second spacer, (FIG. 5, Part 109) and (FIG. 7, example B). Then flip down both the second spacer (FIG. 5, Part 109) and the third spacer (FIG. 6, Part 115) simultaneously to Position D in (FIG. 7, Example D). At this point crosscut the ¼" thick drawer bottom using the position of spacer 109 in FIG. 5, and crosscut the drawer front and back with a miter gauge using the position of spacer 115 in FIG. 6, as in FIG. 7 example D. This will accurately cut to width all the parts, the "Variables," to make a custom width cabinet.

To distinguish this from other similar inventions, at this time, the closest thing to accurately cutting parts without the use of math or tape measures requires expensive software and an even more expensive CNC machine, that additionally requires expensive training and time to learn how to use it. This Flip-down Table-saw Fence is actually faster than the expensive CNC alternative.

This is not an improvement of an existing idea. This is a completely original idea.

Anyone who is already making cabinets and is trained to use a table saw properly, can learn to use the Flip-down Table-saw Fence in as little as five minutes.

GLOSSARY

CONSTANTS: The parts of a cabinet that do not change from one cabinet to the next.

Fence: A part for a table saw that holds a piece to be cut a preset distance from the saw blade.

Flip-Down Fence (FDF): A mechanism that can be attached to a table saw to allow for different distances from the saw blade for each different part to be cut to be established by simply flipping down the flip-down that provides the required distance.

FDF-Flip-Down Fence (FDF): A mechanism that can be attached to a table saw to allow for different distances from the saw blade for each different part to be cut to be established by simply flipping down the flip-down that provides the required distance.

Flip-down Table-saw Fence (FTF): A mechanism that can be attached to a table saw that has three fences hinged together in such a manner as to allow for three different distances from the saw blade to be achieved by simply flipping down the appropriate fence.

FTF-Flip-down Table-saw Fence: A mechanism that can be attached to a table saw that has three fences hinged together in such a manner as to allow for three different distances from the saw blade to be achieved by simply flipping down the appropriate fence.

VARIABLES: The parts of a cabinet that differ from one cabinet to the next.

The invention claimed is:

1. An apparatus for adjusting a width of a cut by a table saw, comprising:
    a saddle for setting on a fence of the table saw, a side of the fence defining the width of the cut; and
    at least a first spacer hinged to the saddle such that the first spacer can be flipped down about a first pivot point to be disposed adjacent to the side of the fence shortening the width of the cut by a first spacer width.

2. The apparatus of claim 1, wherein the saddle obtains a friction fit across opposite sides of the fence of the table saw.

3. The apparatus of claim 1, wherein the saddle is integrated into the fence of the table saw.

4. The apparatus of claim 1, wherein the first spacer comprises an L-shape, the first pivot point is disposed at a top of the L-shape coupled to a side of the saddle, a bottom of the L-shape comprises the first spacer width.

5. The apparatus of claim 1, further comprising a second spacer hinged to the first spacer such that, after flipping down the first spacer, the second spacer can be flipped down about a second pivot point shortening the width of the cut by a second spacer width in addition to the first spacer width.

6. The apparatus of claim 5, wherein the first spacer comprises an L-shape, the first pivot point is disposed at a top of the L-shape coupled to a side of the saddle, a bottom of the L-shape comprises the first spacer width; and
    the second spacer comprises a straight length, the second pivot point is disposed at an end of the straight length coupled to an end of the bottom of the L-shape, and a length of the straight piece comprises the second spacer width.

7. The apparatus of claim 5, further comprising a third spacer hinged to the second spacer such that, after flipping down the first spacer but without flipping down the second spacer, the third spacer can be flipped down about a third pivot point shortening the width of the cut by a third spacer width in addition to the first spacer width.

8. The apparatus of claim 7, wherein the first spacer comprises an L-shape, the first pivot point is disposed at a top of the L-shape coupled to a side of the saddle, and a bottom of the L-shape comprises the first spacer width;
    the second spacer comprises a straight length, the second pivot point is disposed at an end of the straight length coupled to an end of the bottom of the L-shape, and a length of the straight piece comprises the second spacer width; and
    the third spacer comprises a wedge piece, the third pivot point is disposed at a top of the wedge piece coupled to a midpoint of the second spacer, and a width of the wedge piece comprises the third spacer width.

9. The apparatus of claim 1, further comprising a second spacer hinged to the first spacer such that, after flipping down the first spacer, the second spacer can be flipped down about a second pivot point shortening the width of the cut by a second spacer width in addition to the first spacer width;
    wherein the second spacer comprises a straight length, the second pivot point is disposed at an end of the straight length coupled to an end of the bottom of the L-shape, and a length of the straight piece comprises the second spacer width.

10. The apparatus of claim 9, further comprising a third spacer hinged to the second spacer such that, after flipping down the first spacer but without flipping down the second spacer, the third spacer can be flipped down about a third pivot point shortening the width of die cut by a third spacer width in addition to the first spacer width;
    wherein, the third spacer comprises a wedge piece, the third pivot point is disposed at a top of the wedge piece coupled to a midpoint of the second spacer, and a width of the wedge piece comprises the third spacer width.

11. An apparatus for adjusting a width of a cut by a table saw, comprising:
    a saddle for setting on a fence of the table saw, a side of the fence defining the width of the cut; and
    a first spacer comprising an L-shape having a first pivot point disposed at a top of the L-shape hinged to a side of the saddle such that the first spacer can be flipped down about the first pivot point to be disposed adjacent to the side of the fence shortening the width of die cut by a bottom of the L-shape, the bottom of the L-shape comprising a first spacer width.

12. The apparatus of claim 11, wherein the saddle obtains a friction fit across opposite sides of the fence of the table saw.

13. The apparatus of claim 11, wherein the saddle is integrated into the fence of the table saw.

14. A method for adjusting a width of a cut by a table saw, comprising:
    setting a saddle on a fence of the table saw, a side of the fence defining the width of the cut; and
    flipping down at least a first spacer hinged to the saddle about a first pivot point to be disposed adjacent to the side of the fence shortening the width of the cut by a first spacer width.

15. The method of claim 14, further comprising flipping down a second spacer hinged to the first spacer about a second pivot point, after flipping down the first spacer, such that the second spacer shortens the width of the cut by a second spacer width in addition to the first spacer width.

16. The method of claim 15, further comprising flipping down a third spacer hinged to the second spacer about a third pivot point, after flipping down the first spacer but without flipping down the second spacer, such that the third spacer shortens the width of the cut by a third spacer width in addition to the first spacer width.

17. The method of claim 16, wherein the first spacer comprises an L-shape, the first pivot point is disposed at a top of the L-shape coupled to a side of the saddle, and a bottom of the L-shape comprises the first spacer width;
    the second spacer comprises a straight length, the second pivot point is disposed at an end of the straight length coupled to an end of the bottom of the L-shape, and a length of the straight piece comprises the second spacer width; and
    the third spacer comprises a wedge piece, the third pivot point is disposed at a top of the wedge piece coupled to a midpoint of the second spacer, and a width of the wedge piece comprises the third spacer width.

18. The method of claim 14, wherein setting the saddle on the fence comprises obtaining a friction fit across opposite sides of the fence of the table saw.

19. The method of claim 14, wherein the saddle is integrated into the fence of the table saw.

\* \* \* \* \*